United States Patent
Lee et al.

(10) Patent No.: US 9,161,027 B2
(45) Date of Patent: Oct. 13, 2015

(54) METHOD AND APPARATUS FOR PROVIDING CAMERA CALIBRATION

(71) Applicant: ELECTRONICS AND TELECOMMUNICATIONS RESEARCH INSTITUTE, Daejeon (KR)

(72) Inventors: Joo-Haeng Lee, Daejeon (KR); Hyun Kim, Daejeon (KR); Hyoung Sun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 29 days.

(21) Appl. No.: 14/062,095

(22) Filed: Oct. 24, 2013

(65) Prior Publication Data
US 2014/0118557 A1   May 1, 2014

(30) Foreign Application Priority Data
Oct. 29, 2012  (KR) .................. 10-2012-0120264

(51) Int. Cl.
 G06K 9/00   (2006.01)
 H04N 17/00  (2006.01)
 G06T 7/00   (2006.01)
 H04N 7/18   (2006.01)

(52) U.S. Cl.
 CPC ............ *H04N 17/002* (2013.01); *G06T 7/0018* (2013.01); *G06T 7/0042* (2013.01); *G06T 2207/10004* (2013.01)

(58) Field of Classification Search
 CPC .................................. H04N 17/00; G06T 7/00
 USPC ............ 348/151, 174, 175, 188, 207.99, 348/208.12, 374, 580, 145; 382/100
 See application file for complete search history.

(56) References Cited

U.S. PATENT DOCUMENTS

| | | | |
|---|---|---|---|
| 7,671,891 B2 * | 3/2010 | Fitzgibbon et al. | ........... 348/188 |
| 2010/0201681 A1 * | 8/2010 | Criminisi et al. | ............. 345/419 |
| 2012/0105599 A1 * | 5/2012 | Lin et al. | .......................... 348/50 |
| 2012/0106866 A1 | 5/2012 | Minakawa et al. | |

FOREIGN PATENT DOCUMENTS

| | | |
|---|---|---|
| KR | 10-2005-0061115 A | 6/2005 |
| KR | 10-2010-0059026 A | 6/2010 |

OTHER PUBLICATIONS

Jun-Sik Kim et al., "Estimating Intrinsic Parameters of Cameras using Two Arbitrary Rectangles", Proceedings of the 18th International Conference on Pattern Recognition(ICPR'06), pp. 707-710, 2006.

Zhengyou Zhang, "A Flexible New Technique for Camera Calibration", IEEE Transactions on Pattern Analysis and Machine Intelligence, vol. 22, No. 11, pp. 1330-1334, Nov. 2000.

* cited by examiner

*Primary Examiner* — Abolfazl Tabatabai
(74) *Attorney, Agent, or Firm* — LRK Patent Law Firm

(57) ABSTRACT

A method for providing a camera calibration includes recovering geometric information from a single rectangular image, obtaining intrinsic and extrinsic construction information of a camera based on the recovered geometric information, obtaining a shooting position and real geometric information of the camera from the obtained intrinsic and extrinsic construction information of the camera.

12 Claims, 13 Drawing Sheets

FIG.9A
FIG.9B
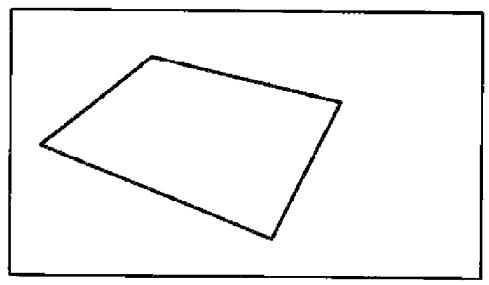
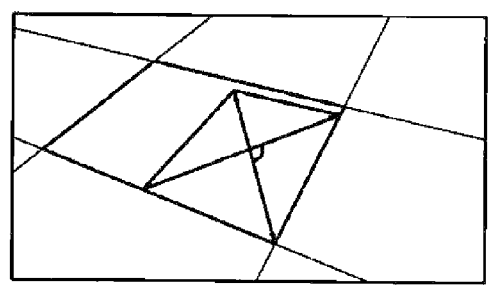
FIG.9C
FIG.9D
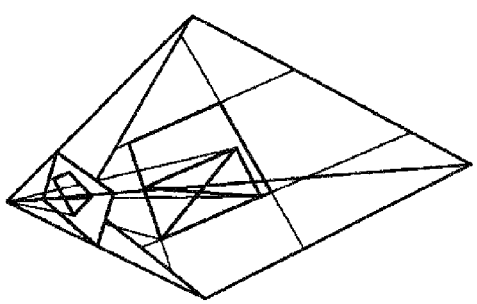
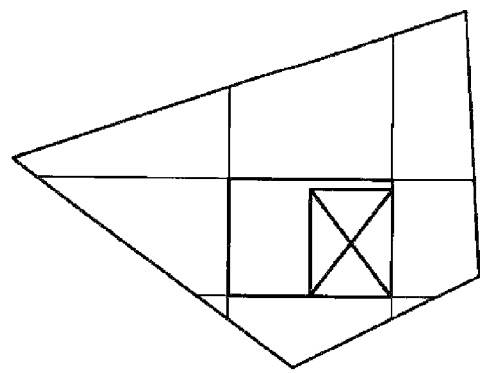

METHOD AND APPARATUS FOR PROVIDING CAMERA CALIBRATION

RELATED APPLICATIONS

This application claims the benefit of Korean Patent Application No. 10-2012-0120264, filed on Oct. 29, 2012, which is hereby incorporated by reference as if fully set forth herein.

FIELD OF THE INVENTION

The present invention relates to a calibration technology to find out intrinsic and extrinsic parameters of a camera, and more particularly, to a method and apparatus for providing a camera calibration, which is adapted to detect a relative shooting position of a camera and geometric information of a real image using a rectangular image having an arbitrary size and aspect ratio in a scene.

BACKGROUND OF THE INVENTION

A camera calibration is defined as to find out an intrinsic construction (for example, lens property and imaging method) and an extrinsic construction (for example, position and direction of a camera). It is a major technical issue in a field of computer vision, and also an augmented reality-based core element technology whose interest is increased recently.

Information on a camera intrinsic construction is not explicitly known if not an expensive one, and it is not easy to measure information on a camera extrinsic construction except a special case. Accordingly, a variety of methods to measure such intrinsic and extrinsic construction information are suggested, which usually use a single image for three-dimensional object constructed precisely in advance or a plurality of images for a checkerboard whose size is known.

However, the three-dimensional object is so complicated that it is not easy to use it in a normal environment and that it is not proper to apply to a cheap camera such as a smart phone camera. While a method to use a plurality of images for a simple checkerboard is most widely used, such a method takes a long time comparatively to measure so that it is not easy to apply to a real time application.

SUMMARY OF THE INVENTION

In view of the above, the present invention provides a camera calibration technology, capable of detecting a relative shooting position of a camera using a rectangular image having an arbitrary size and aspect ratio in a scene.

Further, the present invention provides a camera calibration technology, capable of capturing geometric information such as a size, aspect ratio, etc. for a real image used to detect a shooting position of a camera.

In accordance with an aspect of an exemplary embodiment of the present invention, there is provided a method for providing a camera calibration in an apparatus for providing a camera calibration, which includes: recovering geometric information from a single rectangular image; obtaining intrinsic and extrinsic construction information of a camera based on the recovered geometric information; and obtaining a shooting position and real geometric information of the camera from the obtained intrinsic and extrinsic construction information of the camera.

In the exemplary embodiment, wherein said recovering geometric information comprises: detecting an intersection point of two diagonals from the single rectangular image to generate a centered quadrangle.

In the exemplary embodiment, wherein the centered quadrangle is generated using a vanishing-point constraint condition.

In the exemplary embodiment, wherein said obtaining a shooting position and real geometric information of the camera comprises: dividing a model of the camera into a two-dimensional segment camera model pair; recovering a projection structure from the centered quadrangle using the two-dimensional segment camera models in pairs; and obtaining a rectangular image calibrated using a homography.

In the exemplary embodiment, wherein the two-dimensional segment camera models in pairs are constructed of a plane triangle.

In the exemplary embodiment, wherein the plane triangle comprises an image statement.

In the exemplary embodiment, wherein the image segment is divided by a projection central line.

In the exemplary embodiment, further comprising: generating each sphere based on each center of the two-dimensional segment camera model pair.

In the exemplary embodiment, wherein an arbitrary point of an intersection circle of each sphere is set as a shotting position of the camera.

In the exemplary embodiment, wherein the recovering a projection structure comprises: calculating a direction of a first segment camera; calculating a distance to a common projection center; calculating a direction of a second segment camera; calculating a projection angle and a segment distance of the first segment camera; and calculating a projection angle and a segment distance of the second segment camera.

In accordance with another aspect of the exemplary embodiment of the present invention, there is provided an apparatus for providing a camera calibration, which includes: a geometric information recovery unit configured to recover geometric information from a single rectangular image; and a construction information obtaining unit configured to obtain intrinsic and extrinsic construction information of a camera based on the recovered geometric information and obtain a shooting position and real geometric information of the camera from the intrinsic and extrinsic information of the camera.

In the exemplary embodiment, wherein the geometric information recovery unit is configured to detect an intersection point of two diagonals from the single rectangular image to generate a centered quadrangle.

In the exemplary embodiment, wherein the centered quadrangle is generated using a vanishing-point constraint condition.

In the exemplary embodiment, wherein the camera comprises a pinhole camera.

In accordance with the present invention, it is possible to easily detect extrinsic parameters to express a position and direction of a camera by performing a camera calibration using a single image for rectangular objects that can be easily found in a daily life (TV, monitor, window, and door, for example), instead of using a plurality of images for a three-dimensional calibration object or a checker board. Further, the camera calibration in accordance with the present invention is performed with a simple calculation and is robust to errors so that it is expected that its availability is high in various application fields such as position based service, robot navigation, and augmented reality technology.

BRIEF DESCRIPTION OF THE DRAWINGS

The above and other objects and features of the present invention will become apparent from the following description of the embodiments given in conjunction with the accompanying drawings, in which:

FIGS. 9A to 9D are views respectively illustrating cases to which simulation views of FIGS. 7A to 7D are actually applied;

DETAILED DESCRIPTION OF THE EMBODIMENTS

Figure 1:
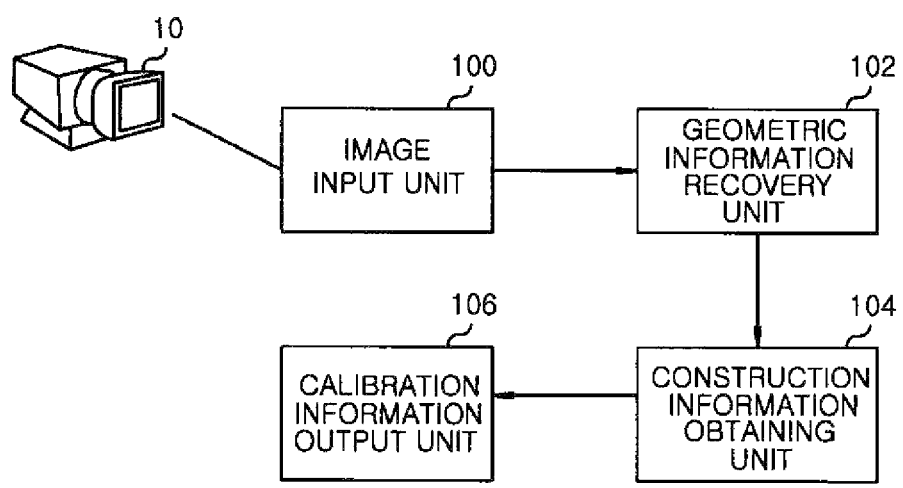
FIG. 1 is a schematic block diagram of an apparatus for providing a camera calibration to obtain a position of a camera and real geometric information from a single rectangular image in accordance with an exemplary embodiment of the present invention.

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

The combinations of the each block of the block diagram and each operation of the flow chart may be performed by computer program instructions. Because the computer program instructions may be loaded on a general purpose computer, a special purpose computer, or a processor of programmable data processing equipment, the instructions performed through the computer or the processor of the programmable data processing equipment may generate the means performing functions described in the each block of the block diagram and each operation of the flow chart. Because the computer program instructions may be stored in a computer usable memory or computer readable memory which is capable of intending to a computer or other programmable data processing equipment in order to embody a function in a specific way, the instructions stored in the computer usable memory or computer readable memory may produce a manufactured item involving the instruction means performing functions described in the each block of the block diagram and each operation of the flow chart. Because the computer program instructions may be loaded on the computer or other programmable data processing equipment, the instructions performed by the computer or programmable data processing equipment may provide the operations for executing the functions described in the each block of the block diagram and each operation of the flow chart by a series of functional operations being performed on the computer or programmable data processing equipment, thereby a process executed by a computer being generated.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

Before describing exemplary embodiments of the present invention, it is noted that the present invention relates to making extrinsic parameters to express a position or a direction of a camera detected with ease by performing a camera calibration using a single image for rectangular objects that can be easily found in a daily life (TV, monitor, window, and door, for example), instead of using a Plurality of images for a three-dimensional calibration object or a checker board, whereby the subject of the present invention will be achieved easily from this technical idea.

Hereinafter, embodiments of the present invention will be described in detail with reference to the accompanying drawings so that they can be readily implemented by those skilled in the art.

FIG. 1 is a schematic block diagram of an apparatus for providing a camera calibration in accordance with an exemplary embodiment of the present invention, which includes a camera 10, an image input unit 100, a geometric information recovery unit 102, a construction information obtaining unit 104, and a calibration information output unit 106.

Referring to FIG. 1, the image input unit 100 is an input unit to which an arbitrary rectangular image shot by the camera 10 is input, which serves to provide the geometric information recovery unit 102 with the arbitrary rectangular image. The arbitrary rectangular image may be an image photographed by the camera 10 on rectangular objects found in a daily life, such as window, door, frame, monitor, TV, billboard, tile, etc.

Normally, a calibration result of the camera 10 may be expressed as a multiplication of two matrices, K×W, where, K is an intrinsic parameter of the camera 10, 3×3, matrix; and W is an extrinsic parameter, 3×4 matrix. Three-dimensional rotation R (3×3) and three-dimensional translational transformation T (3×1) in extrinsic parameters can be expressed as follows.

$$W=[R|T] \qquad \text{Equation 1}$$

In accordance with an embodiment of the present invention, the camera 10 may be a standard pinhole camera model, where a focal distance is f=fx=fy in which width and length directions are identical with each other, an offset is fixed at the center of an image, and a lens distortion is not considered. When an image size is determined by a width ix×a length iy, the center of the image may be (cx, cy)=(ix,iy)/2. Accordingly, K may be expressed as a following Equation 2.

$$K = \begin{bmatrix} f & 0 & cx \\ 0 & f & cy \\ 0 & 0 & 1 \end{bmatrix}$$ Equation 2

That is, it is viewed that an unknown value in the intrinsic parameter of the camera 10 is only one, f.

Referring to FIG. 1 again, the geometric information recovery unit 102 serves to recover geometric information, that is, an aspect ratio of the rectangular image provided through the image input unit 100.

Figure 3:
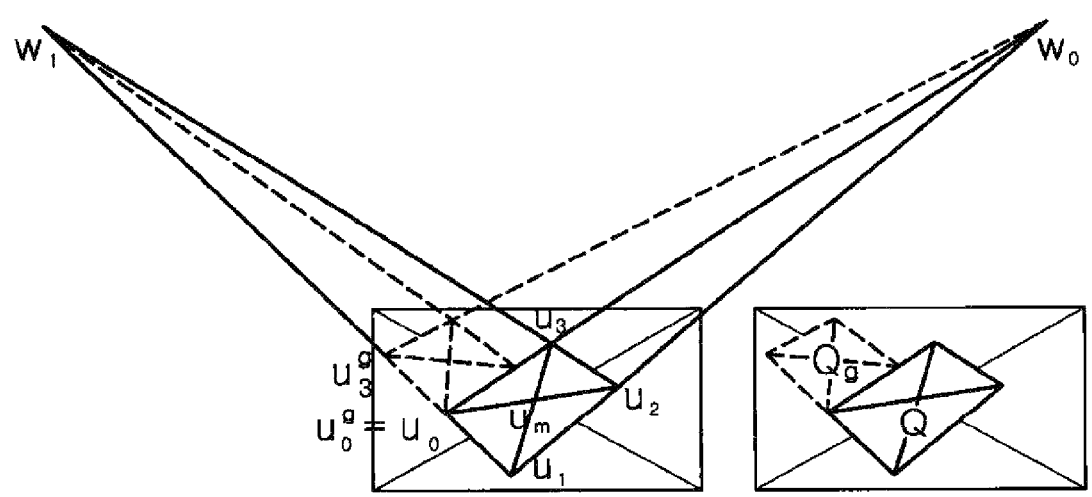
FIG. 3 is a view illustrating a procedure where a quadrangle Q whose center is positioned in the center of a rectangular image is extracted from the image.

FIG. 3 illustrates a procedure to recovery such geometric information of a rectangular image.

As illustrated in FIG. 3, on the assumption that an arbitrary rectangular object put in an environment is G, when the G is shot, a quadrangle Q is generated in an image. It may be determined that the center of Q is an intersection point Um of two diagonals of Q. In a particular case that the center Um of Q is on the center of an image (centered quadrangle), it is possible to recover geometric information of the arbitrary rectangle G.

However, the centered quadrangle is not formed in a normal situation. When a quadrangle $Q_g$ in an image that does not meet the centered quadrangle, i.e., an off-centered quadrangle, is an image of unknown rectangle $G_g$, the centered quadrangle is formed from the $Q_g$, and an imaginary quadrangle Q that becomes an image of a certain rectangle G may be inferred using a vanishing-point constraint condition.

In order to make calculation simple, a following canonical form will be conducted. That is, although an aspect ratio of the rectangle G is not known, it is assumed that its two diagonals are same as one (1) in length. Accordingly, geometric information to be recovered may correspond to an internal angle ψ of two diagonals.

The construction information obtaining unit 104 obtains the intrinsic and extrinsic construction information of the camera 10 on the basis of the geometric information recovered through the geometric information recovery unit 102. In more detail, the construction information obtaining unit 104 serves to recover a projection structure as a frustum, and to calculate the extrinsic and intrinsic parameters of the camera 10.

The calibration information output unit 106 outputs the intrinsic and extrinsic construction information (parameters) of the camera 10 obtained through the construction information obtaining unit 104 and an aspect ratio of a rectangle. The information as above is then provided to a variety of application systems to control the camera 10, such as navigation systems, robot application systems, billboard systems, etc.

Figure 2:
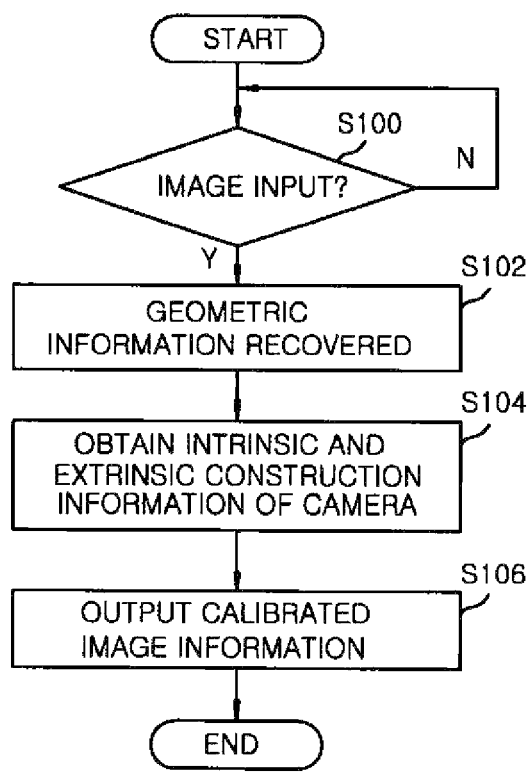
FIG. 2 is a flowchart illustrating a method for providing a camera calibration in accordance with an exemplary embodiment of the present invention.

Along with the configuration described above, a method for providing a camera calibration illustrated in FIG. 2 may be realized in accordance with an exemplary embodiment of the present invention.

Referring to FIG. 2, the method for providing a camera calibration in accordance with an exemplary embodiment of the present invention include inputting an image in operation S100, recovering geometric information in operation S102, obtaining intrinsic and extrinsic construction information of the camera 10 in operation S104, and outputting calibrated image information in operation S106.

Hereinafter, the method for providing a camera calibration will be explained in more detail.

In the process to recover a projection structure in accordance with an exemplary embodiment of the present invention, a standard pinhole camera is divided into two two-dimensional segment cameras (also referred to as two-dimensional line cameras) in pairs. Here, information on the two-dimensional segment cameras is imaginary information, which may be assigned to each diagonal of a rectangle G as illustrated in FIGS. 4A to 4C.

Figure 4A:
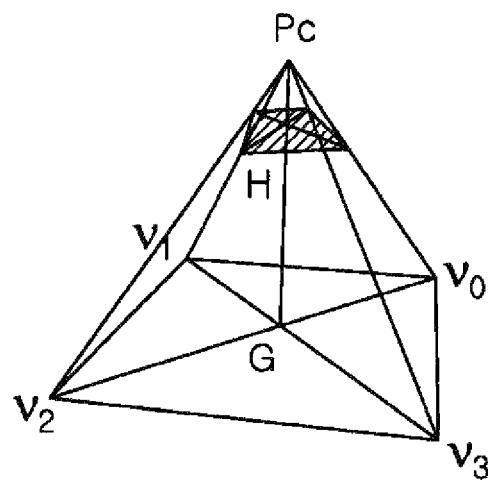
FIGS. 4A, 4B and 4C views illustrating cases where camera construction information is divided into a projective structure frustum and two segment camera models that can be defined when obtaining the camera construction information in accordance with an exemplary embodiment of the present invention.
Figure 4B:
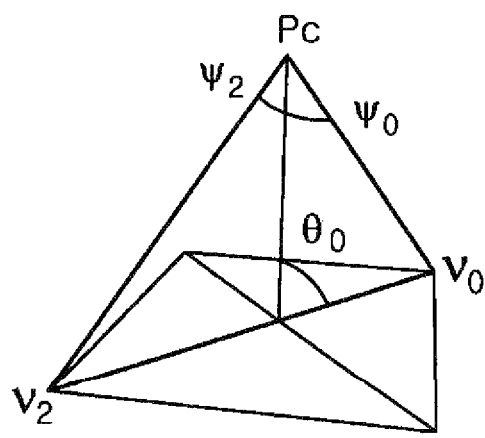
Figure 4C:
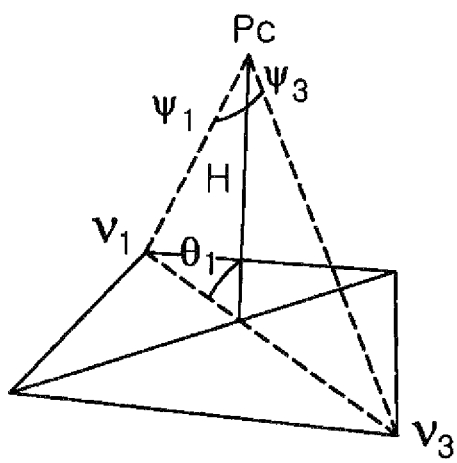

FIG. 4A illustrates a projection structure frustum defined when a rectangle G (where respective apexes are $v_0$ to $v_3$ is shot at a projection center $P_c$ in a pinhole camera scheme, and FIGS. 4B and 4C illustrate cases where a pinhole camera model is divided into a segment camera.

The frustum of a segment camera is not constructed of a stereographic triangle, but of a planar triangle. Accordingly, both an object and an image are defined as segments.

Figure 5:
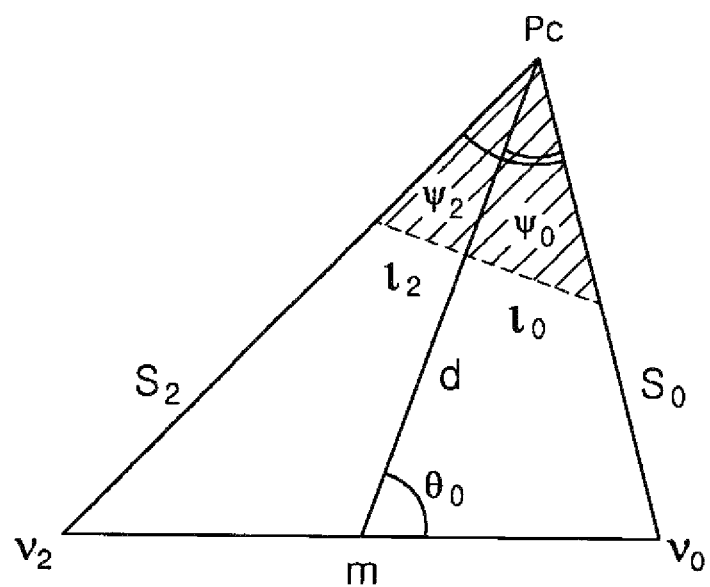
FIG. 5 is a view illustrating a segment camera model that is applied to an exemplary embodiment of the present invention.

As illustrated in FIG. 5, an image segment may be divided by a principal axis.

In FIG. 5, a segment $v_0$-$v_2$ corresponds to one diagonal of an arbitrary rectangular image. A straight line which connects between a center of the diagonal m and a projection axis $P_c$ is a principal axis; $l_0$ and $l_2$ denote length of an image segment; and $ψ_0$ and $ψ_2$ denote projection angles.

Figure 6:
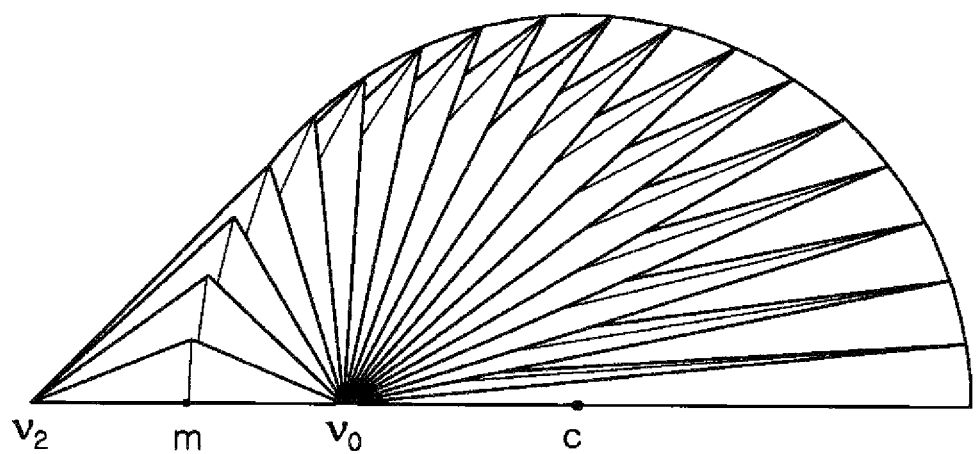
FIG. 6 is a view illustrating a case where a sphere having a center C is formed in a segment camera model of FIG. 5.

If such a division ratio is given, a sphere may be determined, on which an optical center of the segment camera is located, as illustrated in FIG. 6. When a ratio of $l_0$ and $l_2$ is fixed in the segment camera, it shows that available positions of the projection center form a sphere. Further, a sphere having a center C may be formed when rotating a semicircle of FIG. 6.

Since a real camera is a pinhole camera comprised of two line cameras, two spheres may be defined in each line camera. With a geometric restriction condition that centers of the two segment cameras should be identical with each other being added, it is possible to find out one point $P_c$ of the crossed circle of two spheres. This $P_c$ is a common projection center of two line cameras, which also corresponds to an apex of a frustum corresponding to a projection structure of a pinhole camera.

A movement value T among the extrinsic construction parameters of a camera is firstly determined using a position of a projection center $P_c$. Further, a rotational movement value R is found out from a homography H of G and Q. Making use of the above values, an extrinsic parameter of a camera, W=[R|T] is found out.

An unknown f among element values of intrinsic parameter k of a camera may be linearly calculated from a relationship of a coordinate of Q in an image and a coordinate in a geometric frustum.

When a centered quadrangle is not formed, a real rectangle $G_g$ may be found out in a way of calculating $G_g=H \cdot Q_g$ using a homography H. FIGS. 7A to 7D are views illustrating a method for finding out a real rectangle $G_g$ in simulation.

Figure 7A:
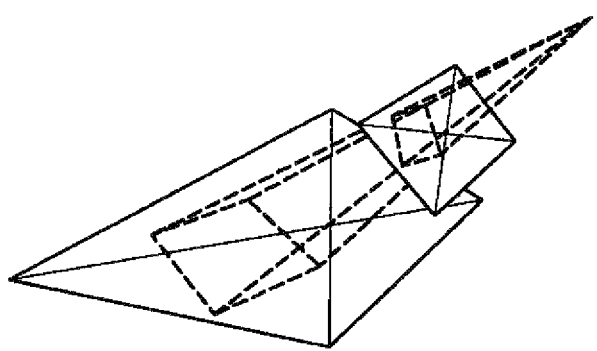
FIGS. 7A to 7D are simulation views illustrating method for providing a camera calibration in accordance with an exemplary embodiment of the present invention.

As shown, FIG. 7A shows how to obtain a quadrangle $Q_g$ by shooting a rectangle G in a scene. In FIG. 7A, a large quadrangle is G and a small quadrangle extended from G is $Q_g$.

Figure 7B:
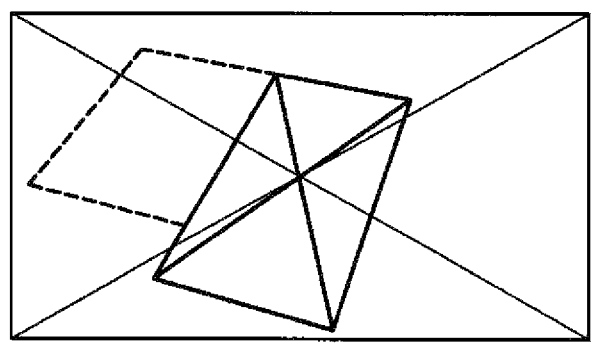
Figure 7C:
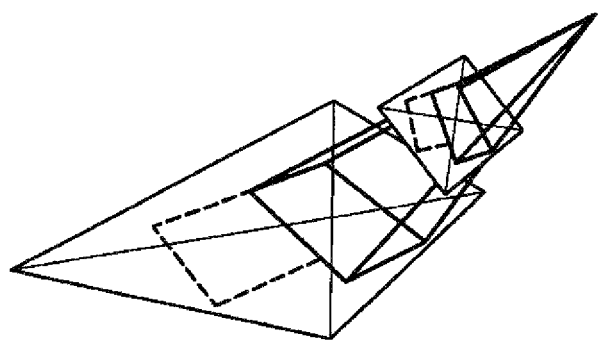

A solid line quadrangle in FIG. 7B is a centered quadrangle Q, and a small solid line quadrangle in FIG. 7C is $G_g$ in which a projection structure is recovered by calculating $P_c$ which is an intersection point between the centered quadrangle Q and the quadrangle G, and the calculation is made using a homography.

Figure 7D:
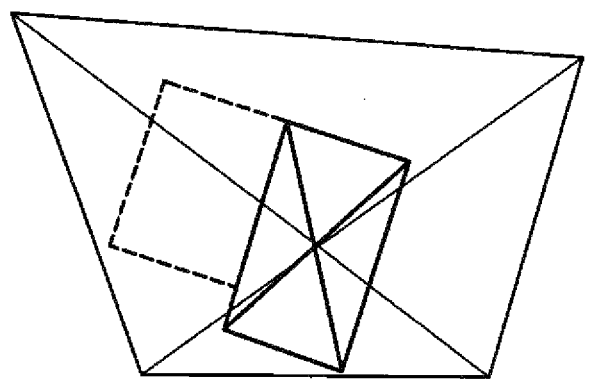

The recovered $G_g$, and G can be identified in FIG. 7D.

Figure 8A:
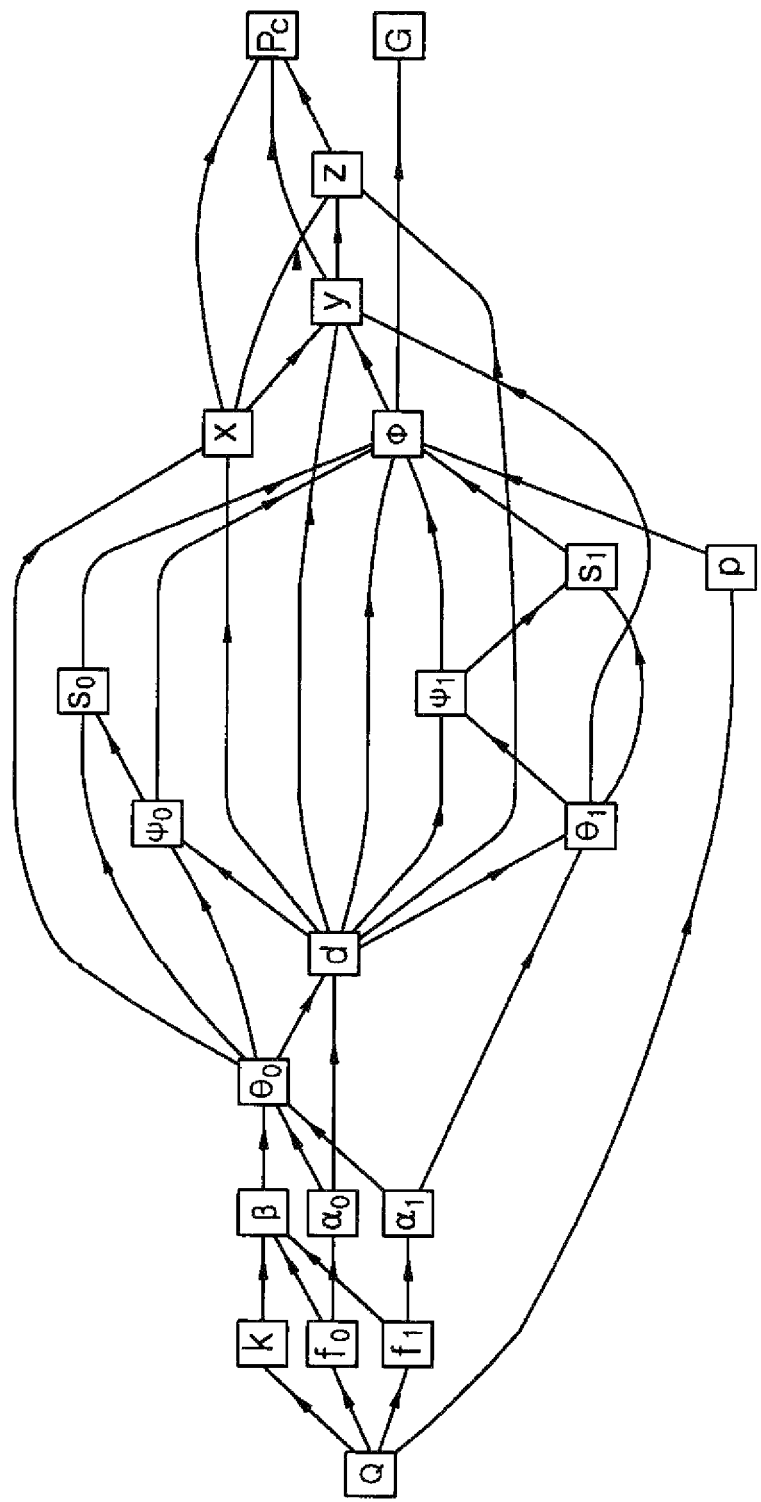
FIGS. 8A and 8B are diagrams illustrating a process to extract an angle of a diagonal of a rectangle corresponding to a coordinate of a projection point Pc being a position of a camera from a centered quadrangle Q.
Figure 8B:
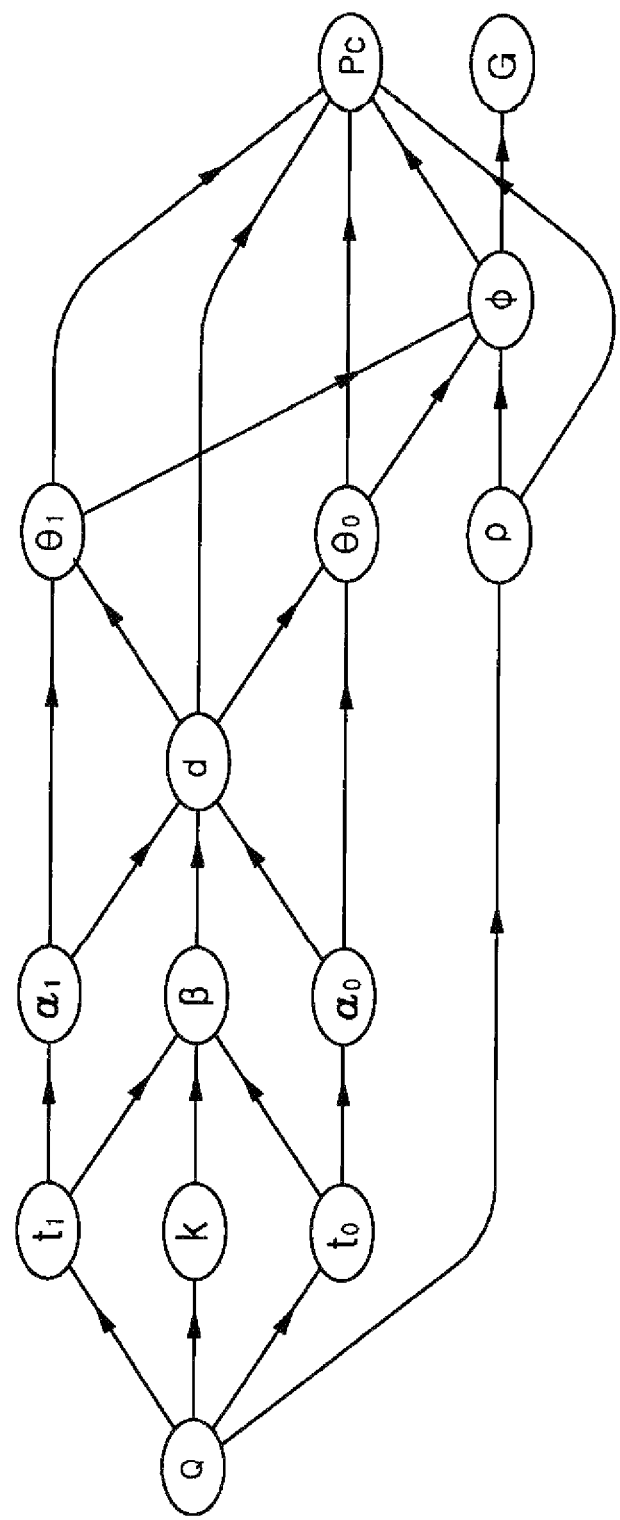

FIGS. 8A and 8B are views illustrating a process to extract an angle of diagonals of a rectangle corresponding to a coordinate of a projection point P which is a position of the camera 10 from a centered quadrangle Q.

Referring to FIGS. 8A and 8B, an actual calculation process for a camera calibration in accordance with an exemplary embodiment may be arranged as following table 1.

TABLE 1

| INPUT | One sheet of rectangular image shot by a camera: img |
|---|---|
| OUTPUT | Camera calibration value: Intrinsic/Extrinsic parameter matrix K and W |
| | Aspect ratio of rectangle (or diagonal angle ψ) |
| PROCESS | 1.0 Extracting quadrangle $Q_g$ from the image |
| | 1.1 Quadrangle is expressed as four apexes |
| | 2.0 Extracting centered quadrangle Q and calculating relevant parameters |
| | 2.1 Calculating centered quadrangle Q using the vanishing—point method |
| | 2.2 Calculating standard parameter of quadrangle Q: k, $t_0$, $t_1$, p |
| | 2.3 Calculating discriminant parameter: $α_0$, $α_1$, β |
| | 3.0 Recovering projection structure using segment camera pair |
| | 3.1 Calculating direction of first segment camera: $θ_0$ |
| | 3.2 Calculating distance to common projection center: d |
| | 3.3 Calculating direction of second segment camera: $θ_1$ |
| | 3.4 Calculating projection angle and segment distance of first segment camera: $ψ_0$, $s_0$ |
| | 3.5 Calculating projection angle and segment distance of first segment camera: $ψ_0$, $s_1$ |
| | 4.0 Recovering centered rectangle G |
| | 4.1 Calculating diagonal angle of rectangle, φ |
| | 5.0 Calculating projection center $P_c$ |
| | 5.1 Calculating coordinate of projection center: (x, y, z) |
| | 6.0 Calculating camera parameter |
| | 6.1 Calculating camera extrinsic parameter: W = [R|T] |
| | 6.2 Calculating camera intrinsic parameter: K |
| | 7.0 Recovering quadrangle $G_g$ |
| | 7.1 Calculating homography H between Q and G: H = s · K · W |
| | 7.2 Calculating $G_g$: $G_g$ = H · $Q_g$ |

FIGS. 9A to 9D are views respectively illustrating cases to which simulation views of FIGS. 7A to 7D are actually applied, wherein a rectangle $G_g$ is an A4 size sheet on a desk.

As illustrated, FIG. 9A illustrates a quadrangle $Q_g$ included in a single image, and FIG. 9B illustrates a centered quadrangle Q inferred from $Q_g$.

FIG. 9C illustrates a case where a projection structure $G_g$ is recovered by calculating G and $P_c$ from the centered quadrangle Q and $G_g$ is calculated using a homograph. In addition, FIG. 9D illustrates the recovered $G_g$ and G. The recovered $G_g$ shows a real A4 size sheet and an aspect ratio within an error range.

Figure 10:
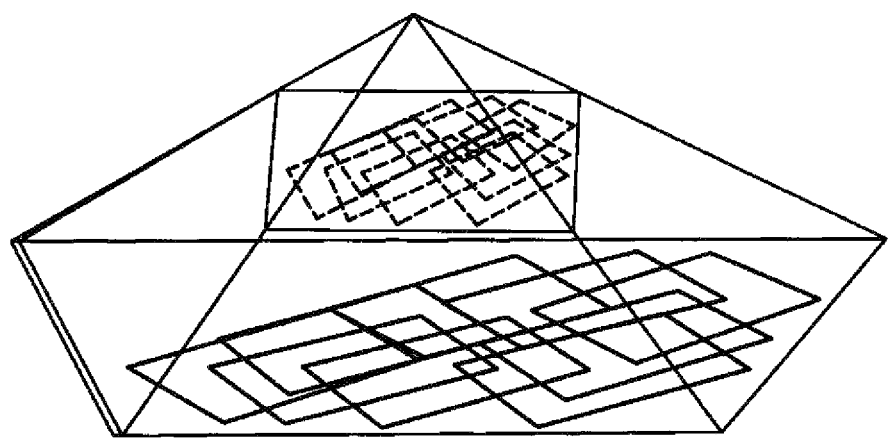
FIG. 10 is a view illustrating a case where results of shooting and recovering a moving operation of the same rectangular object (for example, A4 size sheet) are gathered.

FIG. 10 is a view illustrating a case where results of shooting and recovering a moving operation of the same rectangular object (A4 size sheet, for example) are gathered.

Referring to FIG. 10, rectangles expressed in dotted line are images for original rectangles in respective positions, and rectangles expressed in solid line indicate recovered rectangles.

Figure 11:
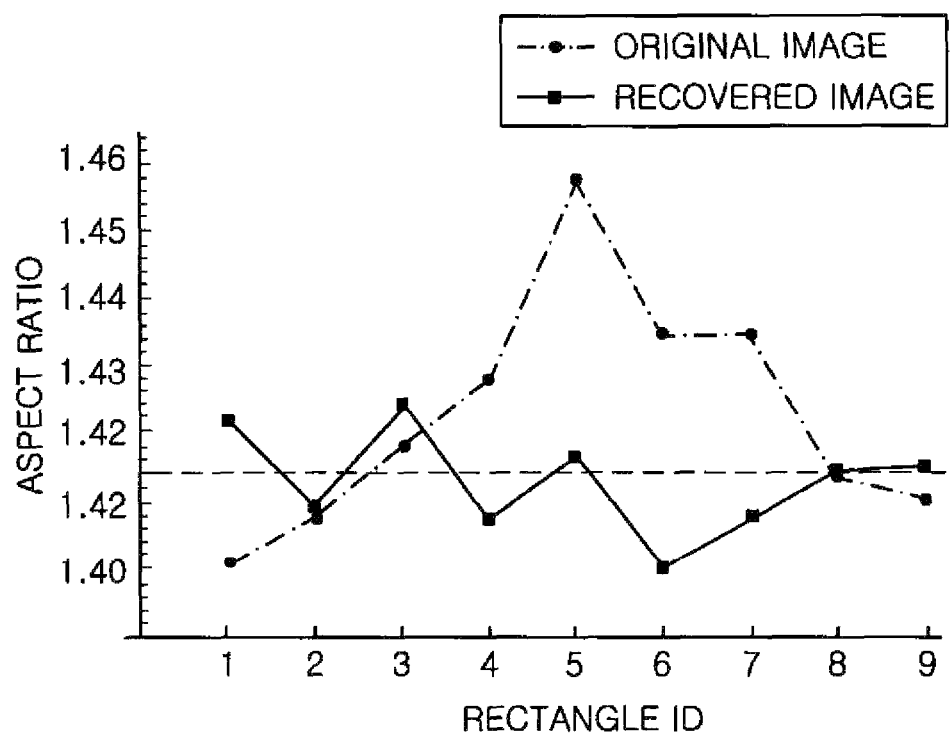
FIG. 11 is a comparison graph illustrating a precision for an aspect ratio of a recovered rectangle.

FIG. 11 is a comparison graph illustrating precision for the aspect ratio of recovered rectangle.

Referring to FIG. 11, it is noted that the image in accordance with the present invention has less errors than the original image.

In accordance with the exemplary embodiment of the present invention described above, it is possible to easily detect extrinsic parameters to express position and direction of a camera by performing a camera calibration using a single image for rectangular objects that can be easily found in a daily life, for example, TV, monitor, window, door, etc., instead of using a plurality of images for a three-dimensional calibration object or a checker board. Further, the camera calibration is performed with a simple calculation and is robust to errors so that it is expected that its availability is high in in various application fields such as position based service, robot navigation, and augmented reality technology.

For example, the exemplary embodiment of the present invention is applied to application fields described in following Tables 2 and 3.

TABLE 2

| APPLIVATION FIELD OF BILLBOARD | |
|---|---|
| SUMMARY | The interactive operation technique of large scale users, capable of transferring their positions based on image in public facility (baseball field, square, for example) using billboard and camera. |
| SYSTEM CONSTRUCTION | Large billboard of rectangular format: used as reference quadrangle and display of system. |
| | Camera calibrated with billboard (or rectangle provided correspondingly thereto) as a reference: fan-tilt controllable, zoom controllable |
| | Application SW and drive server: when a user shoots billboard and sends an image, the application SW and drive server processes the image to drive the camera and display image/contents on the billboard. |
| USER TERMINAL & APPLICATION | Basically constructed of smart phone and its application. |
| | Taking an image of the billboard (or rectangle provided correspondingly thereto) and transmitting it to a server (Using messaging, mail, Internet, other communication methods) |
| | The above action is regarded to agree publication of one's position by implication. |
| SYSTEM SERVICE | Picture sent by a user is analyzed in accordance with the method of the present invention and shooting position is obtained. |
| | The camera is pan-tilted to a place that is assumed to be a user's position and zoomed in so that the user and his surroundings are obtained. |
| | Personal information is removed from the obtained image (facial occlusion, for example) and retransmitted to the user so that person identification is requested. |
| | Providing services selected by the user when identified (an event to show a moving picture of a couple on a billboard in the middle of the game). |

TABLE 3

| ROBOT NAVIGATION APPLICATION FIELD | |
|---|---|
| SUMMARY | Autonomous robot identifies a rectangle as a natural marker in an environment, and then identifies a position based on the rectangle |

TABLE 3-continued

ROBOT NAVIGATION APPLICATION FIELD

| | |
|---|---|
| | to navigate to a target point. |
| SYSTEM CONSTRUCTION | Autonomous robot<br>A camera attached to the robot: Pan-tilt controllable, zoom controllable<br>Identification SW: When a robot shoots image and sends it, the method in accordance with the present invention identifies the position by processing the image.<br>Control SW: Controlling navigation with rectangular natural marker as a target. Especially, calibration can be made by combining rotational errors of a motor with position identification of the present invention. |
| ROBOT APPLICATION | Setting a rectangular target in an environment. Maps prepared in advance can be used: For example, moving to TV, moving to the window, and moving to frame.<br>If possible to identify the target with the camera, then it is possible to set a position where the target can appear in front of camera in a suitable size as an imaginary target, to perform a navigation planning or to calibrate a control error while navigating.<br>If the target does not appear currently in camera, the process is performed in the existing navigation method and previous step is performed at the approximate point when the target appears. |

In accordance with the present invention, it is possible to precisely measure the relative position of a camera or a user, and relative size and aspect ratio of a rectangular object through a single image for rectangular objects existing in a daily life (window, door, frame, billboard, monitor and tile, for example). Accordingly, it is expected that its availability is high in various application fields such as position based service, robot navigation, and augmented reality.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for providing a camera calibration in an apparatus for providing a camera calibration, the method comprising:
   recovering geometric information from a single rectangular image;
   obtaining intrinsic and extrinsic construction information of a camera based on the recovered geometric information; and
   obtaining a shooting position and real geometric information of the camera from the obtained intrinsic and extrinsic construction information of the camera,
   wherein said recovering geometric information comprises:
   detecting an intersection point of two diagonals from the single rectangular image to generate a centered quadrangle.

2. The method of claim 1, wherein the centered quadrangle is generated using a vanishing-point constraint condition.

3. The method of claim 1, wherein said obtaining a shooting position and real geometric information of the camera comprises:
   dividing a model of the camera into a two-dimensional segment camera model pair;
   recovering a projection structure from the centered quadrangle using the two-dimensional segment camera models in pairs; and
   obtaining a rectangular image calibrated using a homography.

4. The method of claim 3, wherein the two-dimensional segment camera models in pairs are constructed of a plane triangle.

5. The method of claim 4, wherein the plane triangle comprises an image statement.

6. The method of claim 5, wherein the image segment is divided by a projection central line.

7. The method of claim 3, further comprising:
   generating each sphere based on each center of the two-dimensional segment camera model pair.

8. The method of claim 7, wherein an arbitrary point of an intersection circle of each sphere is set as a shotting position of the camera.

9. The method of claim 3, wherein the recovering a projection structure comprises:
   calculating a direction of a first segment camera;
   calculating a distance to a common projection center;
   calculating a direction of a second segment camera;
   calculating a projection angle and a segment distance of the first segment camera; and
   calculating a projection angle and a segment distance of the second segment camera.

10. An apparatus for providing a camera calibration, the apparatus comprising:
    a geometric information recovery unit configured to recover geometric information from a single rectangular image; and
    a construction information obtaining unit configured to obtain intrinsic and extrinsic construction information of a camera based on the recovered geometric information and obtain a shooting position and real geometric information of the camera from the intrinsic and extrinsic information of the camera,
    wherein the geometric information recovery unit is configured to detect an intersection point of two diagonals from the single rectangular image to generate a centered quadrangle.

11. The apparatus of claim 10, wherein the centered quadrangle is generated using a vanishing-point constraint condition.

12. The apparatus of claim 10, wherein the camera comprises a pinhole camera.

* * * * *